Feb. 22, 1927.
H. A. PALMER
1,618,943
AUTOMATIC U-BAR CUT-OFF MACHINE
Filed Feb. 9, 1923　　　6 Sheets-Sheet 2
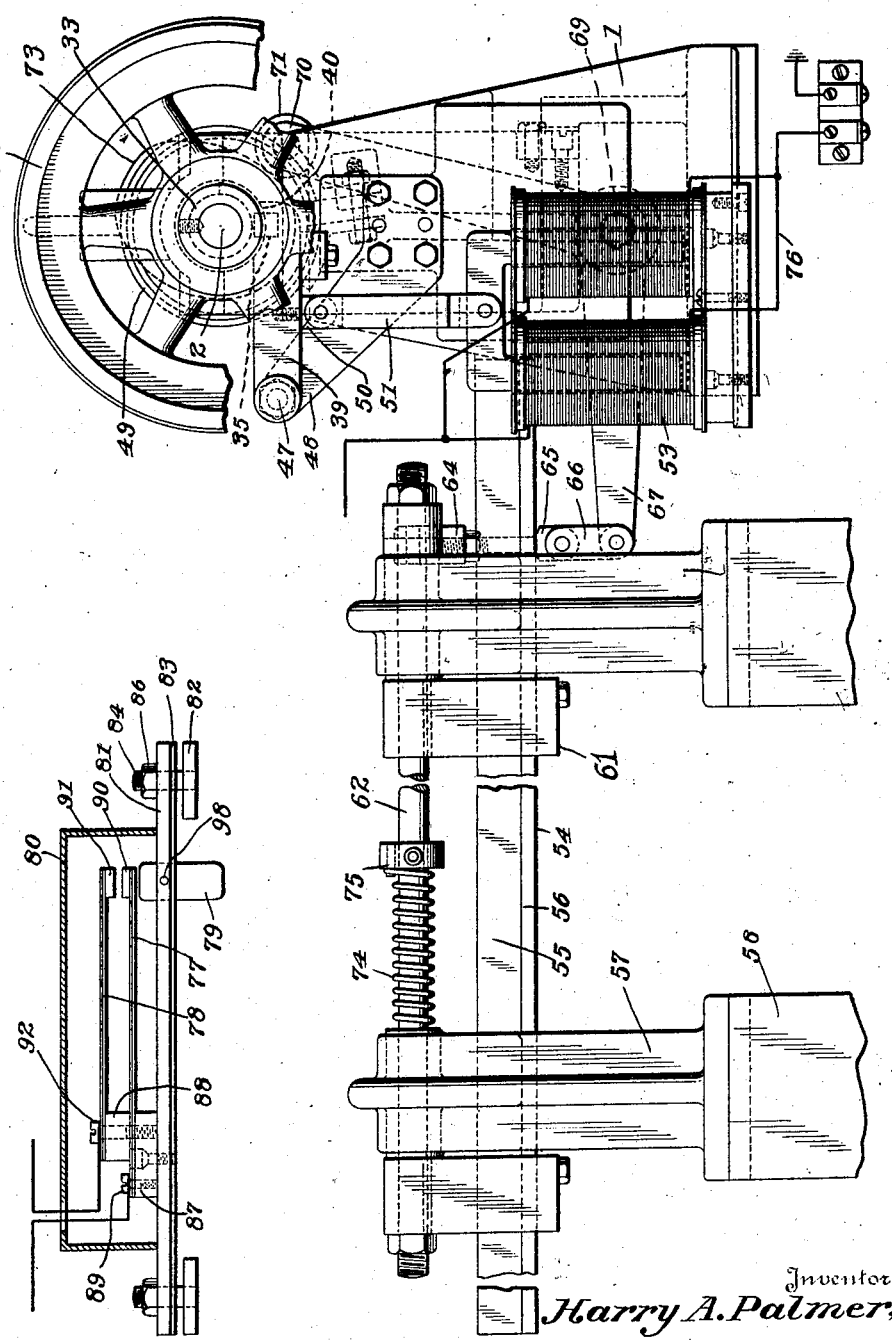
Inventor
*Harry A. Palmer,*
By
Attorney Feb. 22, 1927.  
H. A. PALMER  
1,618,943  
AUTOMATIC U-BAR CUT-OFF MACHINE  
Filed Feb. 9, 1923  6 Sheets-Sheet 3
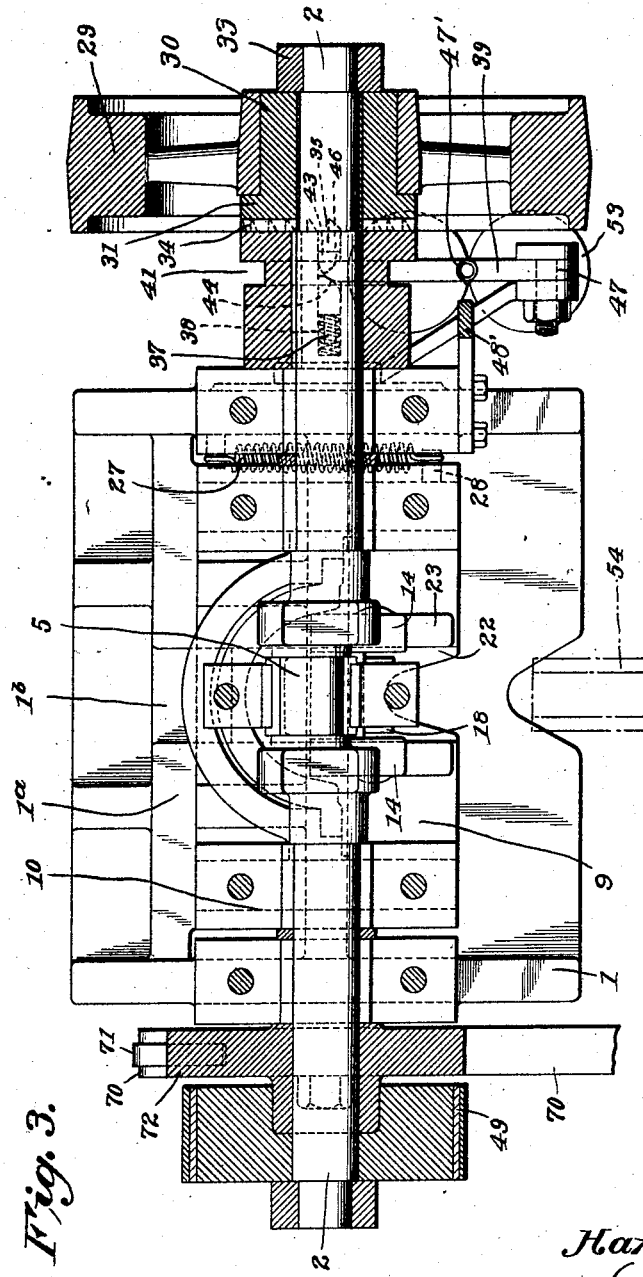
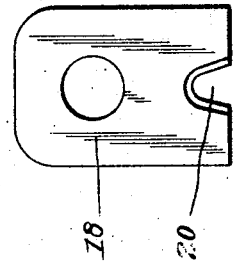
Inventor  
Harry A. Palmer,  
By  
Attorney

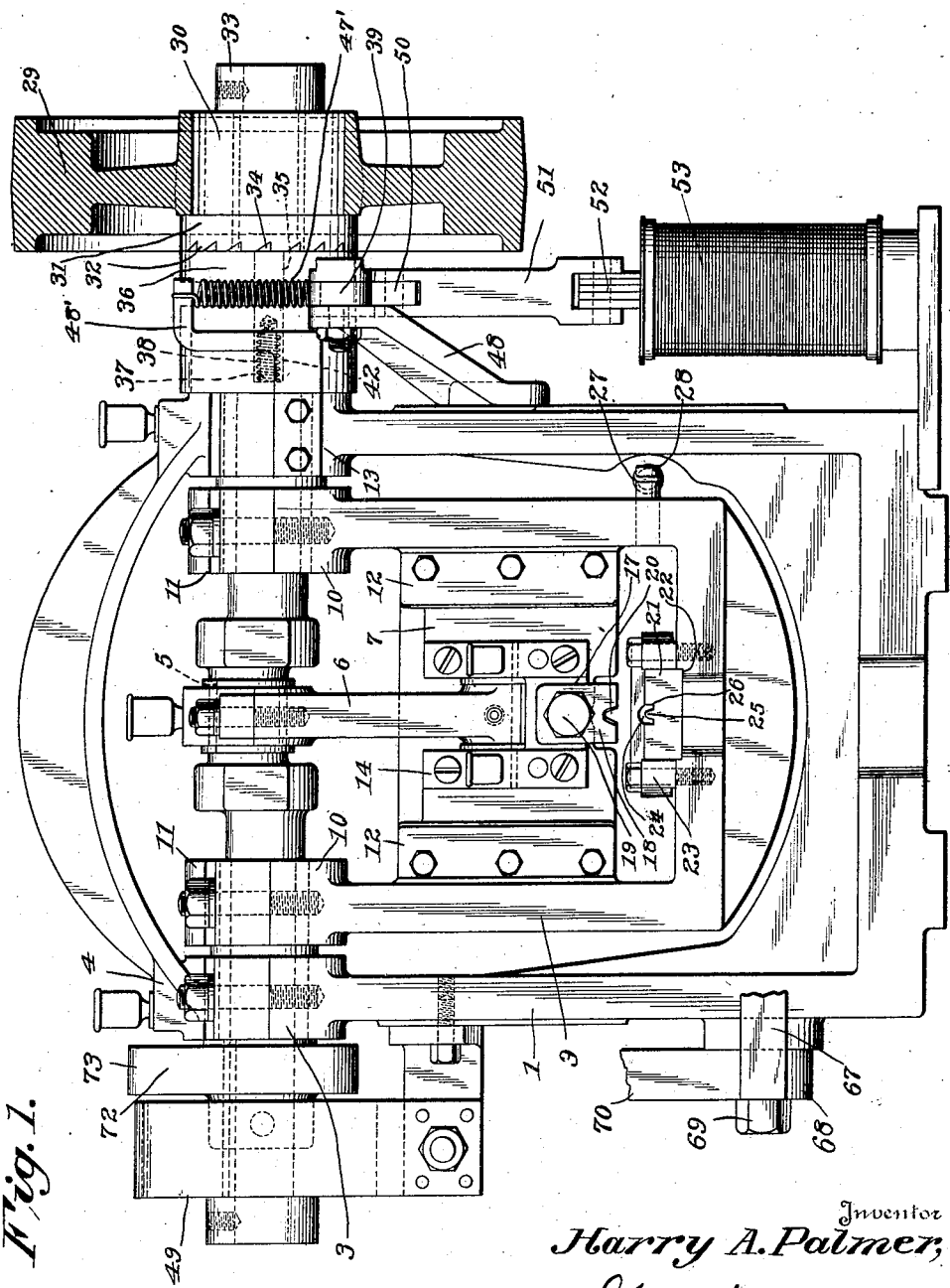

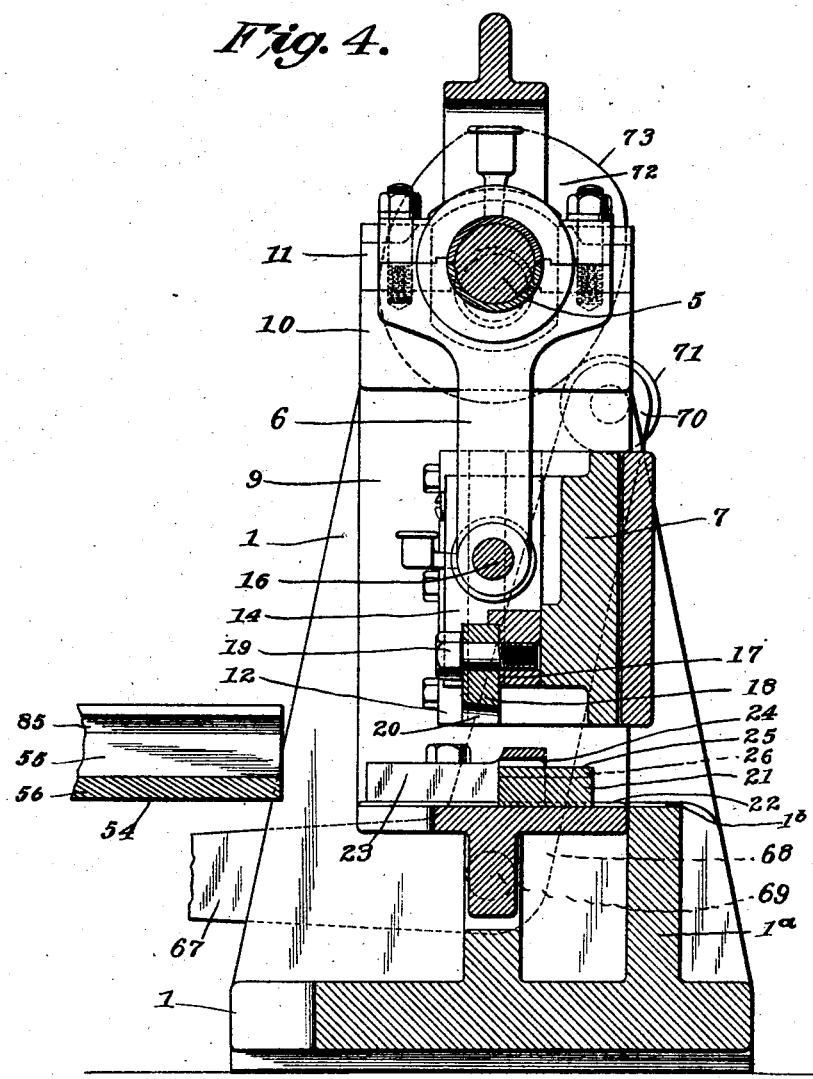

Feb. 22, 1927. 1,618,943
H. A. PALMER
AUTOMATIC U-BAR CUT-OFF MACHINE
Filed Feb. 9, 1923   6 Sheets-Sheet 5
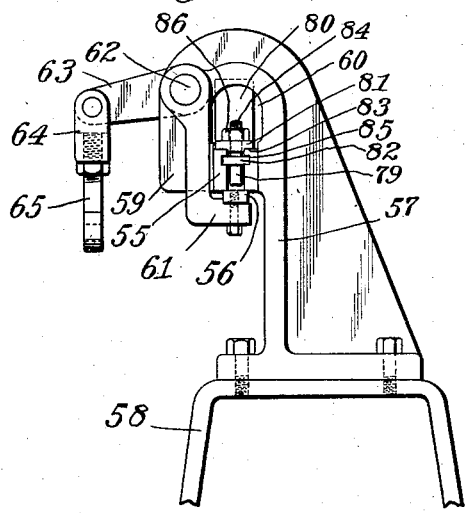
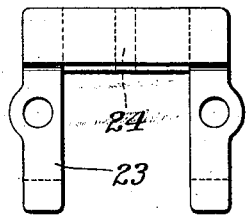
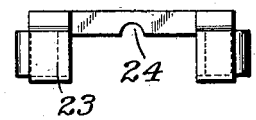
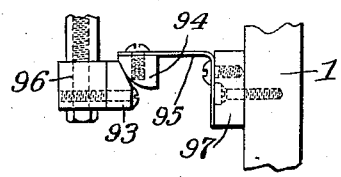
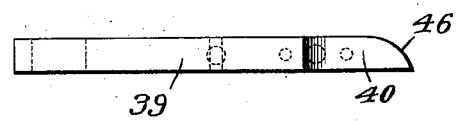
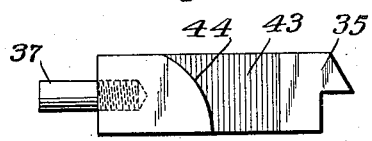
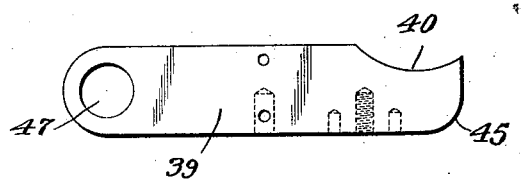
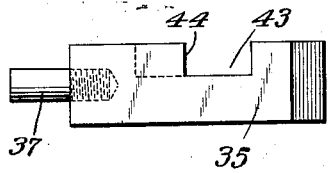
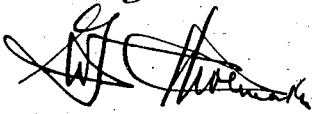
Inventor
Harry A. Palmer,
By
Attorney Feb. 22, 1927.                                                    1,618,943
H. A. PALMER
AUTOMATIC U-BAR CUT-OFF MACHINE
Filed Feb. 9, 1923          6 Sheets-Sheet 6

Inventor
Harry A. Palmer;
By
Attorney

Patented Feb. 22, 1927.

1,618,943

UNITED STATES PATENT OFFICE.

HARRY A. PALMER, OF JACKSON, MICHIGAN, ASSIGNOR TO REYNOLDS SPRING COMPANY, OF JACKSON, MICHIGAN.

AUTOMATIC U-BAR-CUT-OFF MACHINE.

Application filed February 9, 1923. Serial No. 618,139.

The invention relates to an automatic U-bar cut-off machine.

The object of the present invention is to provide a simple, practical and efficient automatic U-bar cutoff machine of strong, durable and comparatively inexpensive construction designed to be placed on the bed of a U-bar rolling machine and to operate on the formed U-bars, as the same leave the U-bar rolling machine, and capable of ready adjustment for enabling U-bars of any required length within the capacity of the machine, to be automatically cut off for use in the production of spring constructions and other work.

A further object of the invention is to provide a cutoff machine of this character capable of having the material to be cut fed into it by the rolling machine which forms the bars whereby separate feeding means for passing the formed bars through the automatic cutting machine will be eliminated.

Another object of the invention is to provide an automatic cutoff machine, capable in the cutting operation, of automatically yielding to the continuous forward feeding movement of the material resulting from the continuous operation of the rolling machine and thereby preventing any buckling of the material which would be liable to result should the same come in contact with relatively fixed cutting means or devices which would interrupt the continuous forward feeding movement of the material.

It is also an object of the invention to provide an automatic cut-off machine adapted to discharge the severed material from it and capable of automatically returning the cutting mechanism to its initial position after the cutting operation.

With these and other objects in view the invention consists in the construction and novel combination and arrangement of parts hereinafter fully described, illustrated in the accompanying drawings and pointed out in the claims hereto appended, it being understood that various changes in the form, proportion and minor details of construction, within the scope of the claims, may be resorted to without departing from the spirit or sacrificing any of the advantages of the invention.

In the drawings, in which like characters of reference designate corresponding parts in the several views:—

Figure 1 is a rear elevation of an automatic U-bar cut-off machine, constructed in accordance with this invention, the guide trough being omitted.

Figure 2 is a side elevation of the automatic U-bar cut-off machine.

Figure 3 is a horizontal sectional view of the same.

Figure 4 is a vertical longitudinal sectional view of the U-bar cut-off machine.

Figure 5 is an end elevation of the guide trough and the means for supporting the same and the movable bottom thereof.

Figure 14 is a detail view of the lower die.

Figure 15 is a similar view of the upper die.

Figures 16 and 17 are detail views of the yoke for holding the lower die.

Figures 18 and 19 are detail views of the latch trip arm of the clutch mechanism.

Figures 20 and 21 are detail views of the spring actuated dog of the clutch mechanism.

Figure 22 is a detail view of the circuit closing means of the clutch operating mechanism.

Figure 23 is a detail view of the adjustable circuit closing device of the guide trough.

Figure 24 is a detail view of the U-bar.

Figure 6:
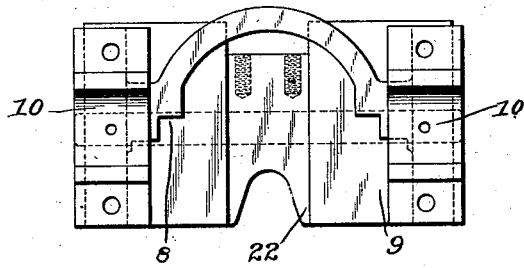
Figure 6 is a plan view of the auxiliary frame.
Figure 8:
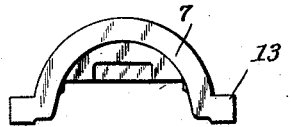
Figures 8 and 9 are detail views of the vertical movable slide.
Figure 7:
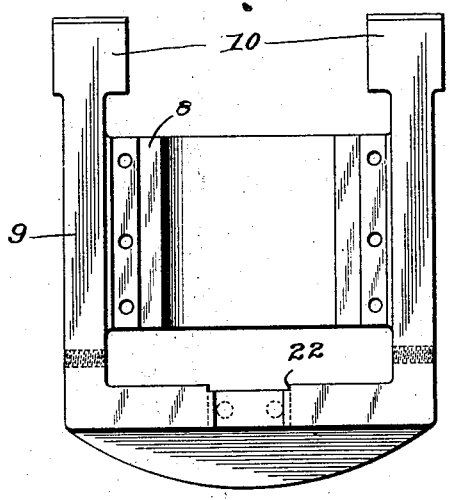
Figure 7 is a rear elevation of the same.
Figure 9:
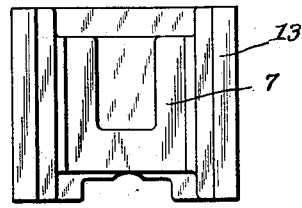
Figure 10:
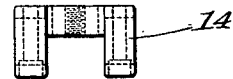
Figures 10 and 11 are detail views of the yoke for connecting the pitman with the slide.
Figure 11:
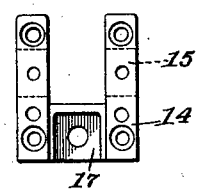
Figure 12:
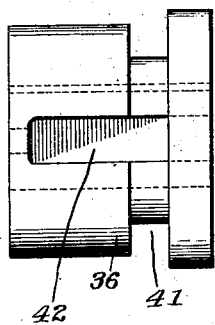
Figures 12 and 13 are detail views of one of the sections or members of the clutch.
Figure 13:
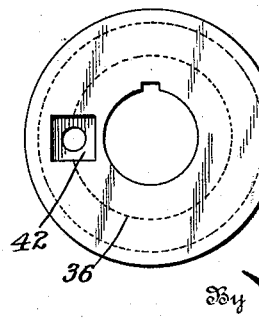

In the accompanying drawing in which is illustrated the preferred embodiment of the invention, the automatic U-bar cut-off machine which is designed to operate in conjunction with a U-bar rolling machine and to have the formed U-bars fed into it by the U-bar rolling machine, comprises in its construction a substantially U-shaped main frame 1 having vertical sides and a connecting integral horizontal bottom portion and supporting a transverse crank shaft 2 journaled in suitable bearings 3 at the tops of the sides of the main frame 1. The bearings 3 are provided with a removable cap piece 4 constituting a transverse frame member and bowed upwardly as shown. The crank shaft 2 which is horizontally disposed, is provided with a central crank 5 which is connected by a rod 6 with a reciprocating slide 7 mounted in vertical ways 8 in the side portions of an auxiliary frame 9 hung from the crank shaft at opposite sides of the crank 5 and adapted to swing backwardly and forwardly as hereinafter fully explained to yield to and move with the formed U-bars in the continuous feeding movement of the same during a cutting operation and to return to its initial vertical position at the completion of the cutting operation. The oscillatory auxiliary frame 9 is provided at the top at opposite sides with bearings 10 provided with removable caps 11 and the said vertical ways 8 at the sides of the frame 9 are formed by recessing the same and by plates 12 bolted or otherwise secured to the sides of the frame 9 and projecting at the recesses to form the outer or front walls of the ways 8. The central portion of the auxiliary frame is bowed forwardly and the vertically reciprocating slide 7 is substantially semi-cylindrical to conform to the figuration of the bowed portion of the auxiliary frame and is provided at opposite sides with laterally extending flanges 13 which slide in the vertical ways of the auxiliary frame.

The vertically reciprocating slide has mounted on it a yoke 14 of approximately U-shape, composed of spaced sides and a connecting bottom portion, the sides being bolted or otherwise secured to the slide at opposite sides of the center thereof and provided with transversely aligned bearing openings 15 in which is mounted a transverse wrist pin 16 for pivotally connecting the lower end of the connecting bar to the yoke and the slide on which the yoke is mounted. The yoke is provided in its bottom transverse connecting portion with a recess 17 in which is secured an upper cutting die 18 fitting the recess at the top and sides thereof and secured to the yoke by a suitable fastening device 19. The upper die 18 which is substantially rectangular is rounded at the upper corners as shown and it is provided in its lower end with a cutting groove 20 preferably tapered as shown and presenting oppositely inclined side walls and a curve connecting top wall to the formed U-bar or strip to be severed into the required lengths. The oppositely inclined sides and the curve connecting top wall substantially conform to the configuration of the U-bar and present cutting edges to the top and sides of the material at one face of the upper cutting die which operates with a shearing action in cutting the U-bar.

The upper die cooperates with a lower cutting die 21 of substantially rectangular form and mounted upon the base of the main frame centrally thereof in a recess 22 of the same and securely held in place by means of a horizontally disposed substantially U-shaped yoke 23 composed of spaced sides and a connecting inner or rear portion which is provided at the center with a groove 24 formed in the lower face of the said connecting portion and being substantially semi-circular in cross section to present a transversely curved concave guiding surface to the top of the U-bar. The sides of the yoke or die attaching member 23 are bolted or otherwise secured to the base of the main frame and the said lower die fits between the sides of the yoke 23 and beneath the transverse connecting portion and extends to the rear edge of the latter, where the cutting of the formed U-bar is effected by the movable upper die 18 which is carried downward by the rotary movement of the crank shaft. By this construction the formed U-bar is guided over the lower die and is held in position so that a clean cut may be made in severing the material. The lower die is provided with a central tongue 25 and it has grooves 26 at opposite sides of the tongue 25. The tongue or rib 25 which is rounded at the top, has inclined sides and conforms to the configuration of and fits within the formed U-bar and supports the material during the cutting operation.

After the auxiliary frame has been swung rearwardly during the cutting operation in yielding to the forward feeding movement of the U-bar, it is returned to its initial vertical position by means of a horizontally disposed coiled spring 27 connected at one end at the side of the main frame and at its other end to the auxiliary frame by means of a pin 28, mounted in the said auxiliary frame and having a grooved projecting portion receiving an eye or loop of the spring 27. The coiled spring 27, which is a tension spring, maintains the auxiliary frame in a vertical position, and is distended by the rearward movement of the auxiliary frame.

The transverse crank shaft is rotated by a fly wheel or pulley 29 when clutched thereto by the means hereinafter described and the said fly wheel or pulley 29, which is designed in practice to be connected by a belt with a pulley of a line or power shaft, is mounted on a reduced portion 30 of a rotating clutch section 31 and is keyed or otherwise secured to the same, but any other suitable means may of course, be employed for imparting rotary motion to the crank shaft. The clutch section 31 which is continuously rotating during the operation of the machine, is provided at its inner end with a clutch face 32 and turns loose on the crank shaft, being held against outward endwise movement by means of a suitable collar 33 secured to the adjacent end of the crank shaft. The clutch face 32 is formed by substantially radially arranged grooves 34 or recesses which are tapered in cross section and present shoulders for engagement by a spring actuated dog 35 carried by a cooperating clutch section 36 mounted on and keyed to the crank shaft and adapted to impart rotary motion to the same when the dog 35 is engaged with the clutch face 32 of the rotating clutch section 31. The dog 35 is preferably rectangular in cross section and is provided at its inner or rear end with a stud 37 extending into a coiled spring 38 for centering the same against the dog whereby the spring is adapted to force the dog 35 forwardly or outwardly into engagement with the clutch face of the continuously rotating clutch section 31 when the said dog is released from its retracted position in which it is held by a clutch trip arm 39. The clutch trip arm 39, which is normally arranged in substantially a horizontal position, extends forwardly from the clutch and its inner end is provided at its upper face with a recess 40 presenting a curved edge to the clutch section 36 and fitting in an annular groove 41 thereof and adapted to engage the clutch dog to retract the same and withdraw the same from engagement with the clutch face 32 and maintain the dog in a retracted position. The annular groove 41 of the clutch section 36 is intersected by the longitudinal opening 42 in which the clutch dog is mounted and the said clutch dog is provided in one of its side faces with a recess 42 having an inclined rounded wall 44 which is engaged by the free inner end of the clutch trip arm 39. The clutch trip arm 39 has its inner end rounded at the lower edge at 45 and bevelled and rounded at the side face at 46 and it is adapted to engage with the said rounded wall or surface 44 of the clutch dog to retract the same and unclutch the section 36 from the section 31 of the clutch. The clutch trip arm 39 is pivoted at its outer end at 47 to the outer end of an inclined bearing arm 48 which is provided at its lower end with an attaching portion bolted or otherwise secured to the main frame of the machine and the said bearing arm 48 extends upwardly and forwardly at an inclination and is bent laterally to arrange its upper outer end in proper position for supporting the clutch trip arm in a position opposite the annular groove of the clutch section 36. When the clutch trip arm is pulled downwardly out of engagement with the recess 43 of the clutch, the spring 38 will force the clutch dog into engagement with the clutch face of the rotating section 31 and rotary movement will be imparted to the crank shaft which will actuate the cutting mechanism. As soon as the clutch dog is engaged with the clutch face of the rotating section, it will be carried away from its initial position a sufficient distance to prevent the clutch dog from being reengaged by the clutch trip arm until the crank shaft has made approximately one revolution. When the clutch trip arm is pulled downwardly by the means hereinafter described the clutch dog is then released, it is then released by the operating mechanism which has drawn it downwardly and it is carried upwardly into the annular groove of the clutch section 36 by means of a substantially vertical coiled spring 47' secured at its lower end to the clutch trip arm and attached at its upper end to a substantially L-shaped arm of a bracket 48 having an attaching portion at the bottom bolted or otherwise secured to the frame of the machine. The bracket 48 consists of a lower horizontal attaching portion and the said L-shaped arm which extends upwardly from one end of the horizontal attaching portion and then transversely over the clutch trip arm to provide a support for the coiled spring 47'. When the clutch trip arm is released by the operating mechanism and is carried upward toward the annular groove of the clutch section 36 by the coiled spring 47', it occupies a position in the path of the clutch dog and just prior to a completion of one revolution of the crank shaft, it will engage the clutch dog and withdraw the same from engagement with the clutch face in order that the crank shaft may be stopped by a brake 49 at the end of one complete revolution of the crank shaft so that the crank shaft will be stopped with the crank loop or bend 5 in an upwardly extending vertical position. The clutch trip arm is provided at its lower edge at a point intermediate of its ends with a depending lug or ear 50 to which is pivoted the upper end of a substantially vertical link 51 which is connected at its lower end to an approximately inverted U-shaped armature 52 preferably of laminated formation and composed of vertical sides and a connecting top portion and connected with the lower end of the link centrally of the top portion. The link is bifurcated at its ends to straddle the lug or ear 50 and the top portion of the armature. The vertical side portions of the armature extend into spaced vertical electro-magnets 53 and when the electro-magnets are energized by the means hereinafter described, the vertical core portions of the armature are drawn downwardly into the electro-magnets and the clutch trip is thereby swung downwardly to release the clutch dog.

The formed U-bar passes between the upper and lower dies and through the U-bar guide into a longitudinal trough 54 disposed longitudinally and adapted to receive and support the length of the U-bar to be severed and it maintains the portion to be severed in proper position with relation to the dies and the guides so that the projecting or extended portion of the U-bar lying beyond the dies will not sag or bend and will be in proper position to be severed by the cutting action of the upper and lower dies. This will enable a proper uninterrupted feeding of the formed U-bar to the automatic cutoff machine to be effected and a clean cut of the dies to be made and the severed U-bar will be in a straight perfect condition when it leaves the automatic cutoff machine. The trough is composed of side walls 55 and a bottom 56 which is adapted to be swung, by the means hereinafter described, from its position beneath and at the lower edges of the side walls for discharging the severed U-bar. The side walls 55, which are spaced apart, are supported by spaced longitudinally aligned standards 57, mounted on supports 58 and provided at the top with overhanging portions or arms 59 forming openings 60 in the lower portions of which are secured the side walls 55 of the trough 54. The bottom 56 is secured to and carried by approximately L-shaped arms 61 of a rock shaft 62 journaled in suitable bearings of the overhanging portions or arms of the standards 57 and provided at its front end with an outwardly extending operating arm 63. The arms 61 consist of depending vertical portions and inwardly extending horizontal portions, and they are located preferably in adjacent the rear faces of the standards 57 and when they are swung outwardly, they carry the bottom 56 from beneath the side walls 55 of the trough and permit the severed U-bar lying in the trough to fall therefrom. The operating arm 63 is connected by a plurality of link sections or members 64, 65 and 66 with an approximately horizontal arm 67 of a bell crank lever 68 fulcrumed at its angle by a bolt or pivot 69 to the main frame 1 and having an upwardly extending arm 70 arranged at a slight inclination and provided at its upper end with a roller 71 arranged to be engaged by a cam 72 of the crank shaft 2. The cam 72 which is located adjacent the left hand end of the machine in Figure 1 of the drawings, is preferably located between the brake 49 and the adjacent side of the main frame and its cam face or portion 73 is arranged to operate in timed relation with the upper cutting die so that after a length of the formed U-bar has been severed by the dies, the cam 72 will actuate the bell crank lever 70 and rock the shaft 62 and thereby withdraw the bottom 56 from the sides of the trough to cause the severed U-bar to fall therefrom. The sections or members 64, 65 and 66 of the link connection between the operating arm of the rock shaft and the bell crank lever provide for the necessary play or movement of the parts incident to the swing of the bell crank lever and the operating arm 63 which is arranged in a plane transversely to that of the bell crank lever. After the cam portion 73 of the cam 72 has passed beyond the upwardly extending arm 70 of the bell crank lever, the rock shaft 62 and the bottom 56 of the trough are returned to their proper position by means of a torsion spring 74 disposed on the rock shaft adjacent to one of the standards 57 and connected with the latter and with a collar 75 adjustably mounted on the rock shaft 62 and adapted to place the coiled torsion spring 74 under the desired tension. The cam portion 73 of the cam 72 is of sufficient length to hold the bottom of the trough in its open position a sufficient period of time to permit the severed U-bar to fall from the trough and clear of the bottom thereof. The horizontal portion of each of the L-shaped arms of the rock shaft is recessed to receive the bottom of the trough which is bolted or otherwise secured to the L-shaped arms.

The length of the severed portion or bar of the formed U-strip is accurately controlled by means of a circuit closing device which is arranged in the magnet circuit 76 and comprising resilient contact members 77 and 78 and a pivoted operating lever 79 located in the path of the formed U-strip or bar and adapted to be engaged by the end of the same and to be oscillated to move the contact member 77 upwardly into engagement with the contact member 78 for closing the magnet circuit for energizing the electromagnets 53 to swing the clutch trip arm 39 downward as heretofore explained. The contact members 77 and 78 which are preferably constructed of spring metal are arranged within a housing or casing 80 constructed of sheet metal and mounted upon a base or supporting plate 81 of substantially oblong form and adjustably seated upon the upper edges of the walls 55 of the trough 54 and clamped to the same by clamping plates 82. The base or supporting plate is recessed at opposite sides of its lower face at 83 to fit between the spaced side walls of the trough and the clamping plates 82 which are adjustably connected with the supporting plate 81 by bolts 84 fitted in opposite longitudinal grooves 85 in the inner faces of the side walls 55 of the trough 54. The bolts or threaded studs 84 which are suitably secured at their lower ends to the plates 82 are threaded at their upper portions for the reception of nuts 86 which are adapted to be adjusted to clamp the base plate 81 in its adjusted position upon the side walls of the trough. By adjusting the base plate 81 and the mechanism carried by the same longitudinally of the trough, the length of the severed portion of the formed U-bar or strip may be varied to cut the material the required lengths for a spring construction and other work.

The casing or housing 80 is of oblong form and is composed of side and end walls and a top wall, and the lower contact member 77 is mounted upon a block 87 in spaced relation with the supporting plate 81 and the upper contact member 78 which is arranged upon a block or piece 88 mounted upon the lower contact member 77 and arranged above the block or support 87. The blocks or supports 87 may be constructed of fibre or any other suitable material and they insulate the contact members from each other and form the supporting plate 81. The lower contact member 77 extends beyond the front end of the upper contact member and a binding screw 89 connects the contact member 78 with a line wire forming a part of the magnet and adapted to feed the current to the same. The rear or free terminals of the contact members 77 and 78 are provided with contacts 90 and 91 which may be of brass or any other suitable material and when the contact 90 is moved into engagement with the contact 91, the circuit will be closed and the electro-magnets energized. A line wire to the magnets is connected to the upper contact member 78 by a screw 92 and the current may be supplied from any suitable source of supply.

After the clutch trip arm has been withdrawn and the clutch dog released and permitted to engage the rotating clutch member or section, the magnet circuit is broken by means of a circuit opening and closing device comprising a contact 93 mounted upon and insulated from the clutch trip arm and arranged to engage a cooperating contact 94 supported by a resilient contact member 95 mounted upon the frame of the machine and insulated therefrom and connected with a line wire leading to a suitable ground as shown. The contacts 93 and 94 may be made of carbon or other suitable material and the contact 93 and the contact arm or member 95 are secured to blocks 96 and 97 of fibre or other suitable insulating material and the said contact arm or member is approximately L-shaped as shown and yieldably supports its contact 95. When the clutch trip arm is pulled down out of engagement with the dog, the circuit is opened at the contacts 93 and 94 and the magnets are deenergized permitting the clutch trip arm to return to the clutch member of section 36 and the circuit will not be closed at the contacts 94 and 95 until the clutch trip arm returns the clutch dog to its initial position. When the clutch trip arm returns to its initial position the magnet circuit will be open at the contacts 90 and 91 and will remain open until the lever 79 is again actuated by the U-strip or bar. The lever 79 is pivoted intermediate of its ends at 98 and its lower arm extends into the trough and is arranged in the path of the U-bar and is adapted to be actuated by the same to swing the upper arm of the lever 79 into engagement with the resilient contact member 77 to close the magnet circuit. The inward or forward movement of the auxiliary frame, after a cutting operation, is limited by a stop 1$^a$ formed on the base of the main frame and consisting of a flange or bar extending across the front of the same and provided with a central shallow recess 1$^b$ for the passage of the formed U-bar A as the same enters the automatic cut-off machine.

While the machine is shown for operating on U-bars, yet it will be readily understood that machines may be constructed for cutting angles and other shaped bars.

What is claimed is:—

1. An automatic cutoff machine including a crank shaft, an auxiliary frame pivotally hung from the crank shaft and solely supported by the same, a lower cutting die mounted on the frame, a slide movable on the frame, a yoke having spaced sides and secured to the slide, a connecting rod actuated by the crank shaft and connected to the yoke between the sides thereof and an upper cutting die secured to the yoke and carried by the slide.

2. An automatic cutoff machine including a crank shaft, an auxiliary frame provided with ways, a slide movable in the ways, a lower cutting die fixed to the auxiliary frame, a yoke having spaced sides and secured to the slide and having bearings, a wrist pin mounted in the bearings, a rod connected with the crank shaft and with the wrist pin between the sides of the yoke, and an upper die located beneath and secured to the yoke.

3. An automatic cutoff machine including a crank shaft, an auxiliary frame pivotally hung from and solely supported by the crank shaft, a lower cutting die mounted on the auxiliary frame, a yoke securing the lower die to the said frame and having spaced sides provided with a guide located at the cutting portion of the said die, a movable upper cutting die and means actuated by the shaft and connected with the yoke between the sides thereof for operating the upper die.

4. An automatic cutoff machine including cutting mechanism, a longitudinal trough open at the top and provided with fixed side walls and having a movable bottom arranged to receive and support a continuously fed bar beyond the cutting mechanism, means for operating the cutting mechanism at intervals to cut the bar and means operated in timed relation for opening a movable bottom of the trough to discharge the severed material therefrom.

5. An automatic cutoff machine including cutting mechanism, a trough arranged to receive and support a continuously fed bar beyond the cutting mechanism, said trough having a movable bottom, a rock shaft provided with an operating arm and connected with the movable bottom to open and close the same, a bell crank lever connected with the operating arm of the rock shaft and a cam for actuating the bell crank lever.

6. An automatic cutoff machine including a shaft, a cutting mechanism actuated by the shaft, a trough having a movable bottom and adapted to receive and support a continuously fed bar beyond the cutting mechanism, a rock shaft having an operating arm and provided with supporting means connected with the said movable bottom, a cam mounted on the said shaft and a bell crank lever connected with the operating arm of the rock shaft and actuated by the said cam to open the movable bottom of the trough.

7. An automatic cutoff machine including cutting mechanism, spaced standards having overhanging portions, a trough open at the top and composed of spaced fixed sides and a movable bottom, the sides being secured in the overhanging portions of the standards, a rock shaft supported by the standards and having arms connected with the movable bottom and means operating in timed sequence with the cutting mechanism to open and close the movable bottom.

8. An automatic cutoff machine including cutting mechanism and means for operating the cutting mechanism for cutting a continuously fed bar at intervals, said means comprising an automatic self-contained clutch having a dog movable automatically in an engaging position, a clutch tripping member normally holding the dog in a disengaged position, an electromagnet having an armature connected with the clutch tripping member, and means located in the path of the bar for operating the magnet to withdraw the clutch tripping member from the dog to permit the latter to automatically move to its engaging position.

9. An automatic cutoff machine including cutting mechanism and means for operating the cutting mechanism for cutting a continuously fed bar at intervals, said means comprising an automatic self-contained clutch having a spring actuated dog, a clutch tripping member normally holding the dog in a disengaged position, an electric circuit, a magnet in the circuit having an armature connecting with the clutch tripping member, and a circuit closing device arranged in the path of the said bar and adapted to be operated by the same for closing the circuit to energize the magnet and withdraw the clutch tripping member from the dog to permit the latter to automatically move to its engaging position.

10. An automatic cutoff machine including cutting mechanism and means for operating the cutting mechanism for cutting a continuously fed bar at intervals, said means comprising a self-contained clutch having a spring actuated dog, a clutch tripping member normally holding the dog in a disengaged position and movable upwardly and downwardly, an electric circuit, a magnet arranged in the electric circuit and having an armature connected with the clutch tripping member for moving the same downwardly, a spring connected with the said member for moving the same upwardly, and means located in the path of the material and adapted to be engaged by the same for closing the circuit to energize the magnet and withdraw the clutch tripping member from the dog to permit the latter to move automatically to its engaging position.

11. An automatic cutoff machine including cutting mechanism and means for operating the cutting mechanism for cutting a continuously fed bar at intervals, said means comprising a self-contained clutch having a spring actuated dog, a clutch tripping member normally holding the dog in a disengaged position, an electric circuit, a magnet arranged in the circuit and having an armature connected with the clutch tripping member and moving the same in one direction, and a circuit opening and closing device having one of its contacts connected with the tripping member, whereby the circuit is opened when the said member is moved by the magnet and is closed when the member is returned to its original position, said member being adapted to release the dog to permit the latter to move automatically to its engaging position.

12. An automatic cutoff machine including cutting mechanism and means for operating the cutting mechanism for cutting a continuously fed bar at intervals, said means comprising a self-contained clutch having a spring actuated dog, a bearing arm, a clutch tripping arm pivoted to the bearing arm and normally holding the dog in a disengaged position, a bracket extending above the clutch tripping arm, a spring connected with the bracket and with the clutch tripping arm, an electric circuit, a magnet arranged in the circuit and having an armature connected with the clutch tripping arm, and a circuit opening and closing device arranged in the path of and adapted to be engaged by the said bar for closing the circuit to energize the magnet and withdraw the tripping arm from the dog to permit the latter to move to its engaging position.

13. An automatic cutoff machine including cutting mechanism and means for operating the cutting mechanism for cutting a continuously fed bar at intervals, said means comprising a self-contained clutch having a spring actuated dog, a pivoted clutch tripping arm normally holding the dog in a disengaged position, an electric circuit, an electro-magnet having a substantially U-shaped armature, a ring connecting the armature with the clutch tripping arm, and a circuit closing device located in the path of the said bar and adapted to be actuated by the same to energize the magnet and withdraw the clutch tripping arm to permit the spring actuated dog to move automatically to its engaging position.

14. An automatic cutoff machine including cutting mechanism, means for operating the cutting mechanism for cutting a continuously fed bar, said means comprising an automatic self-contained clutch having a spring actuated dog, a pivoted clutch tripping arm normally holding the dog in a disengaged position, an electro-magnet having an armature, a ring connecting the armature with the clutch tripping arm, a circuit closing device located in the path of the said bar and adapted to be actuated by the same to energize the magnet and withdraw the arm from the dog to permit the latter to move automatically to its engaging position, and a circuit opening device having a contact connected with the clutch tripping arm for opening the circuit when the arm is actuated by the magnet and for closing the circuit when the arm is returned to its initial position.

15. An automatic cutoff machine including cutting mechanism, a trough located and arranged to receive and support a continuously fed bar, means for operating the cutting mechanism at intervals to cut the said bar, said operating means including a clutch, a movable clutch trip member, an electric circuit, an electro-magnet in the said circuit having an armature connected with the said member, and a circuit closing device adjustably mounted on the said trough and movable to points at different distances from the cutting mechanism to vary the length of the severed material.

16. An automatic cutoff machine including cutting mechanism, a trough located and arranged to receive and support a continuously fed bar, means for operating the cutting mechanism at intervals to cut the said bar, said operating means including a clutch, a movable clutch trip member, an electric circuit, an electro-magnet in the said circuit having an armature connected with the said member, and a circuit closing device provided with clamps slidably interlocked with and engaging the sides of the trough, said circuit closing device being provided with operating means extending into the path of and adapted to be engaged by the said bar.

17. An automatic cutoff machine including cutting mechanism, a trough located and arranged to receive and support a continuously fed bar, means for operating the cutting mechanism at intervals to cut the said bar, said operating means including a clutch, a movable clutch trip member, an electric circuit, an electro-magnet in the said circuit having an armature connected with the said member, and a circuit closing device including a supporting plate arranged upon the sides of the said trough, clamps carried by the supporting plate and slidably interlocked with the sides of the trough and a lever depending from the supporting plate and extending into the path of the bar and adapted to be actuated by the same to close the circuit.

18. An automatic cutoff machine including cutting mechanism, a trough located and arranged to receive and support a continuously fed bar, means for operating the cutting mechanism at intervals to cut the said bar, said operating means including a clutch, a movable clutch trip member, an electric circuit, an electro-magnet in the said circuit having an armature connected with the said member, and a circuit closing device including a supporting plate extending longitudinally of the trough and having recessed side portions fitting the open edges of the sides of the trough, the latter being provided with longitudinal grooves, clamping means carried by the supporting plate and engaging the said grooves and an operating member depending from the supporting plate and arranged in the path of and adapted to be engaged by the said bar.

19. An automatic cutoff machine including a cutting mechanism, a trough located and arranged to receive and support a continuously fed bar, means for operating the cutting mechanism at intervals to cut the said bar, said operating means including a clutch, a movable clutch trip member, an electric circuit, an electro-magnet in the said circuit having an armature connected with the said member, and a circuit closing device including a supporting plate mounted upon the trough and supported by the same, a housing or casing carried by the supporting plate, contact members mounted upon the plate, and arranged with the housing or casing and a lever pivoted to the supporting plate and having upper and lower arms, the upper arm being arranged to move one of the contact members into engagement with the other and the lower arm depending from the supporting plate and arranged in the path of and adapted to be engaged by the bar.

In testimony whereof I have hereunto set my hand.

H. A. PALMER.